United States Patent [19]
Sabee

[11] 3,783,871
[45] Jan. 8, 1974

[54] DIAPER WITH THICKENED FASTENING AREAS

[76] Inventor: Reinhardt N. Sabee, 728 S. Summit St., Appleton, Wis. 54911

[22] Filed: Feb. 14, 1972

[21] Appl. No.: 226,067

Related U.S. Application Data
[63] Continuation-in-part of Ser. No. 17,714, March 9, 1970, abandoned.

[52] U.S. Cl. ............................................. 128/287
[51] Int. Cl. ........................................... A41b 13/02
[58] Field of Search .................... 128/286, 287, 290, 128/296

[56] References Cited
UNITED STATES PATENTS

| | | |
|---|---|---|
| 2,489,104 | 11/1949 | Murrey ............................... 128/287 |
| 2,545,674 | 3/1951 | Ralph .................................. 128/287 |
| 3,402,715 | 9/1968 | Liloia et al .......................... 128/287 |
| 3,509,881 | 5/1970 | Sabee .................................. 128/287 |
| 3,604,422 | 9/1971 | Sabee .................................. 128/287 |

Primary Examiner—Charles F. Rosenbaum
Attorney—Wheeler, House & Wheeler

[57] ABSTRACT

An article such as a diaper or bed pad which includes a pad, an absorbent ply and a polymeric cover ply of extruded synthetic resin, may advantageously be made in various forms having, if desired, a synthetic resin cover ply light in weight and selectively given variable pin or tape retention strength by varying extrusion according to the strength needed to make the film stronger or weaker or softer or more flexible.

24 Claims, 21 Drawing Figures

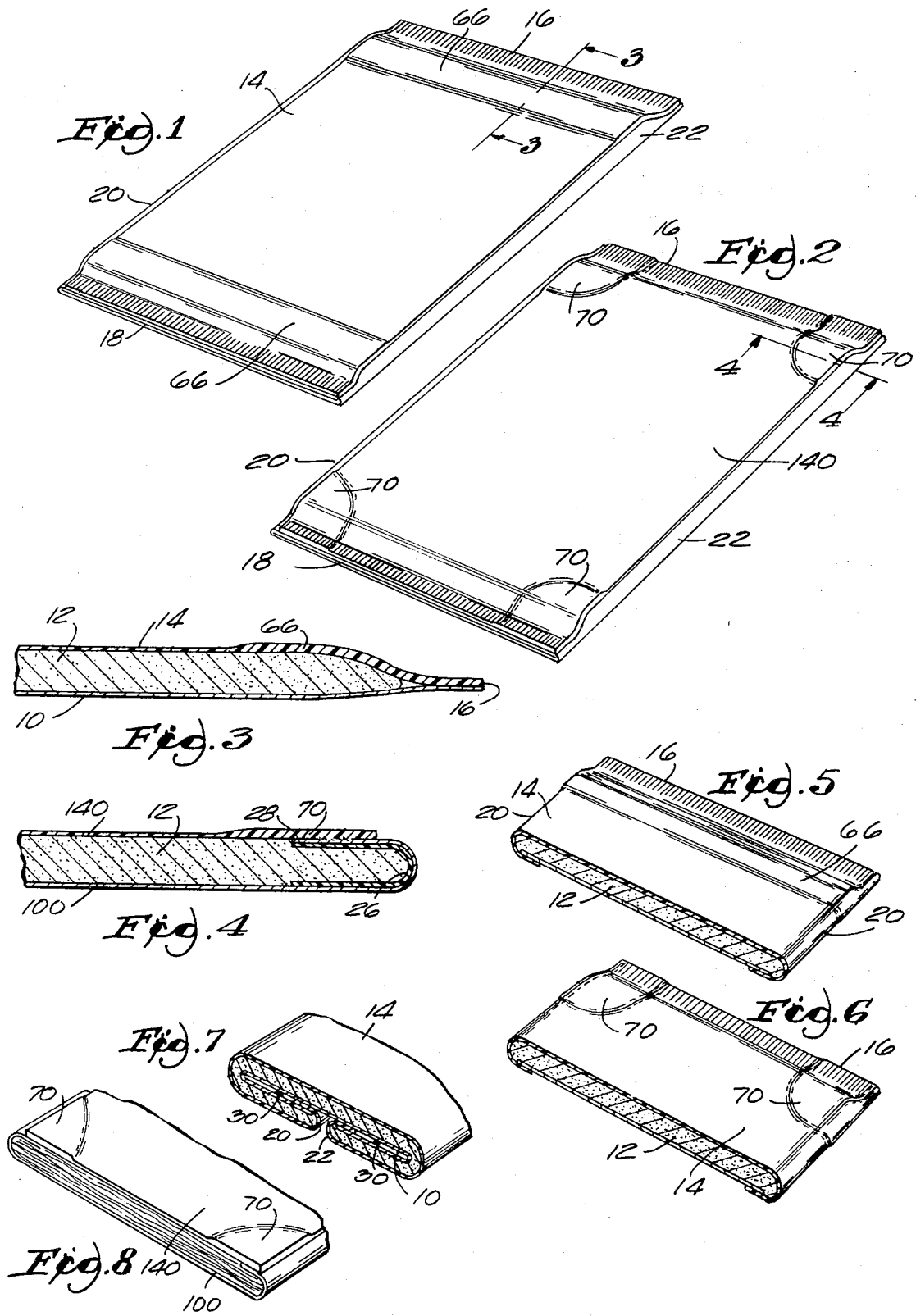

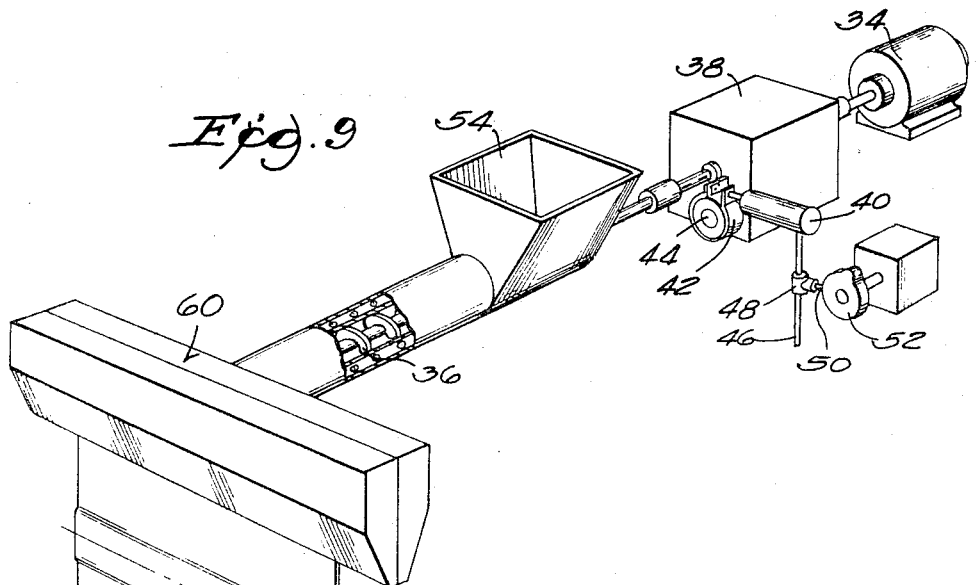
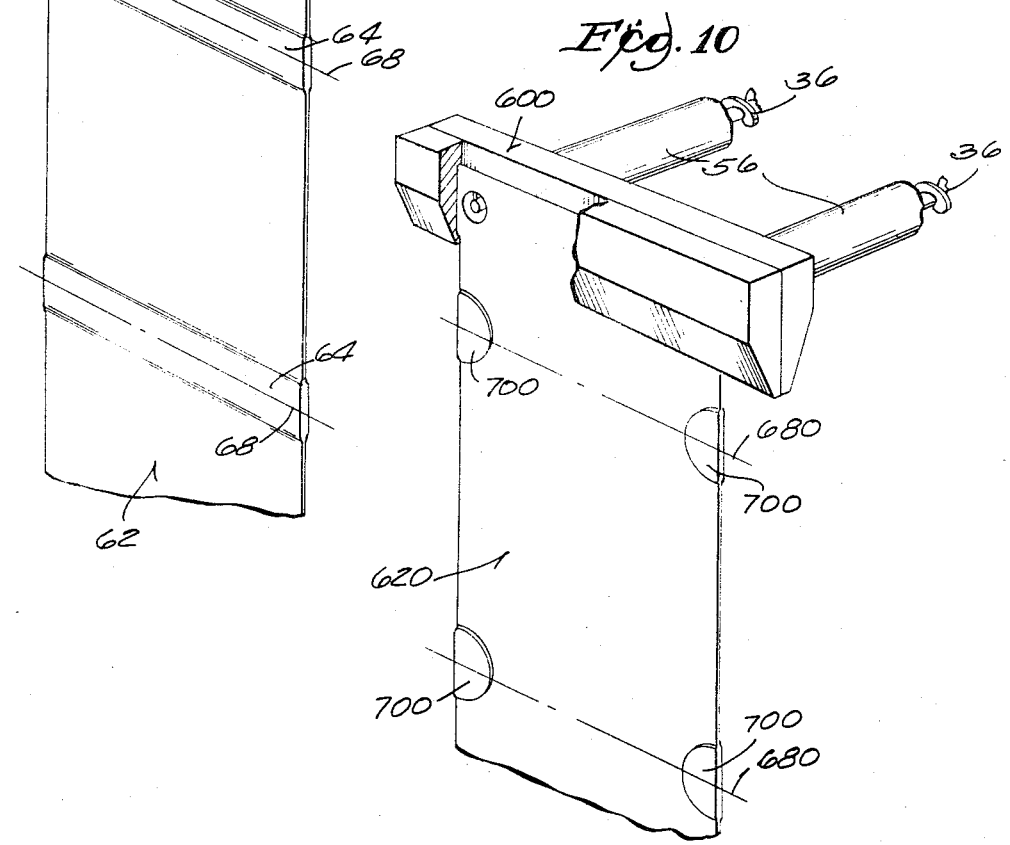

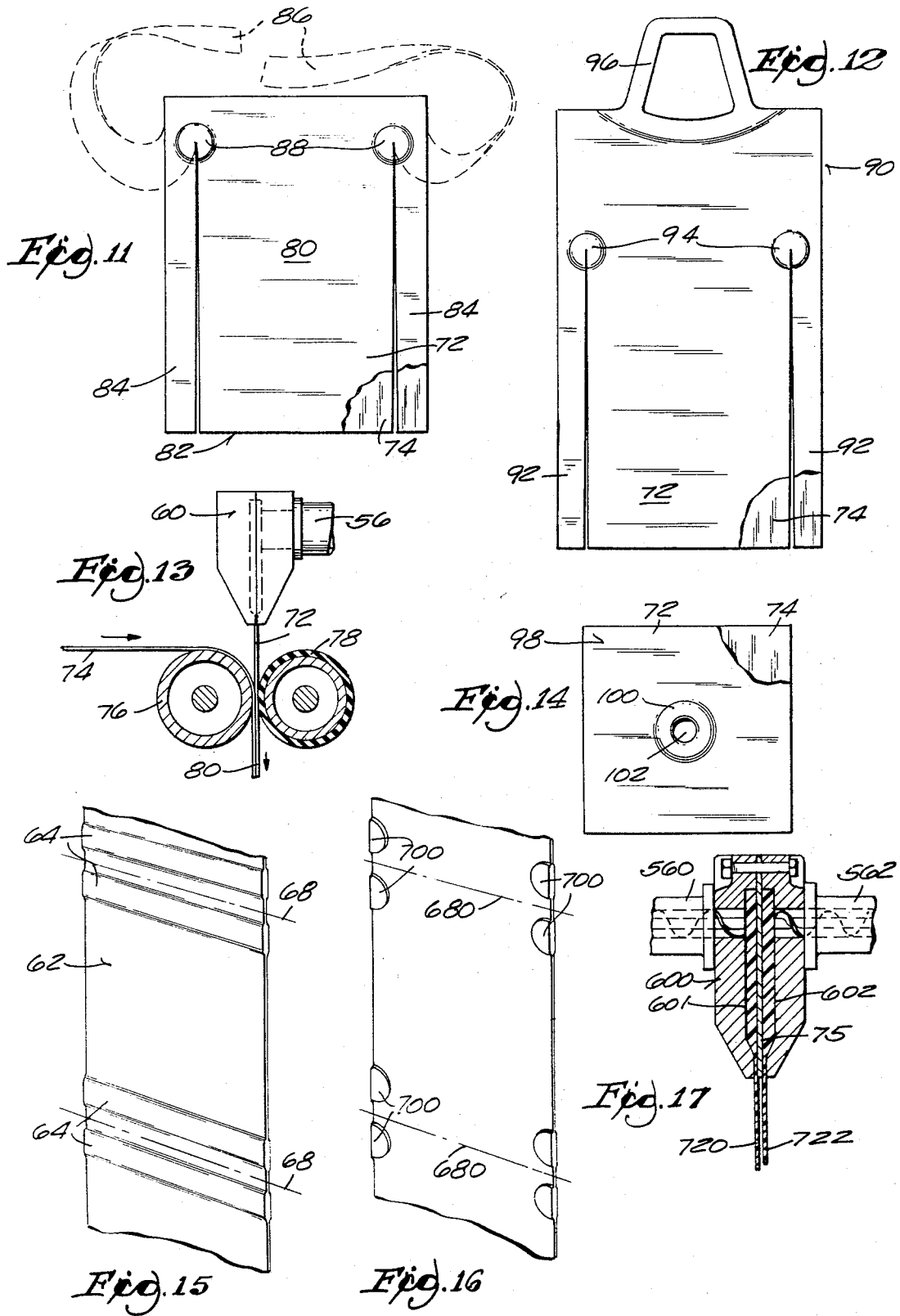

PATENTED JAN 8 1974 3,783,871

DIAPER WITH THICKENED FASTENING AREAS

CROSS REFERENCE

This application is a continuation-in-part of my co-pending application Ser. No. 17,714, filed Mar. 9, 1970, entitled Sanitary Article and Ply with Selectively Thickened Areas and Method of Manufacture and now abandoned.

BACKGROUND OF INVENTION

Synthetic resin film used in web form as backing plies for diapers and the like may tear quite readily if thin enough to be soft and pliable. Prior art efforts to meet this problem have sometimes involved thickening of the entire sheet to provide requisite strength. Such a thickened ply loses its softness and flexibility and becomes expensive.

SUMMARY OF INVENTION

The present invention is based on the discovery that when a plastic film is made singly or by coextrusion, it is readily possible to obtain a film having varying physical characteristics in its longitudinal direction. This may be done with multiple films of different characteristics either by temporarily increasing the flow through the whole slot die or through given portions of an extrusion nozzle or by briefly making heavier a part or all of the cross sectional area and by coextruding a soft film in the rest of the area of the diaper, increased strength being used only in the areas of stress where needed.

By coextruding face to face separately fabricated plies of film, it is possible to use both as a cover film for a single diaper and thus achieve as desired a film that is neither hard on the one hand or soft on the other, but has similar disparate properties in what appears to be a single diaper or the like, notwithstanding that the properties are such that they cannot possibly be achieved in one product. As will be noted, this improved diaper has a new construction with heavier corners for better retention of tapes or pins. Moreover, the external film may have a much softer and more conformable crotch area and its waist band may have a stronger and less stretchable characteristic, thus fitting the baby more snugly and at the same time more softy, thus reducing rashes and irritation. The strength of the copolymeric web as a whole can be increased or the strength at fastening points may be increased to make the diaper lighter in weight and softer and at the same time reducing the cost considerably. It has already been pointed out that one method of making the backing stronger in pinning areas is to make it thicker at these areas. Another method is to use a coextension of two or more films in which an inherently stronger film is thicker at the pinning points and a weaker and softer film is thicker in the crotch area.

From the standpoint of the ultimate product, the invention consists of a web or sheet of plastic usable in a diaper or the like having a backing sheet which over most of its area is only sufficiently thick to be moisture-proof, and hence retains its desirable softness and flexibility, being integrally reinforced in particular areas by the extrusion of resin at a locally increased rate to produce added thickness only where needed.

From the standpoint of the method involved, the selective increase in thickness of the extruded film of resin is achieved by momentarily and in controllable local areas increasing flow through the nozzle or slot-die. At the point of extrusion, the resinous material is hot and rather thick, having relatively high viscosity and being syrupy in character. Most of the thermoplastic resins commonly recognized as extrudable are appropriate, examples being vinyl, polypropylene, and polyethylene and/or copolymers thereof.

Because of the viscosity of the material at the point of extrusion, a sudden increase in flow may be achieved either by enlarging the opening or increasing the pressure on the resin. The increase may be general, throughout the nozzle, or it may be developed in a localized area. If the accelerated flow is almost instantaneously relieved, the resulting thickening of the web will be sharply delineated and it may be confined to a portion of the nozzle. In other words, the flow increase does not have time to spread through the viscous liquid resin to other portions of the nozzle.

This makes it possible to thicken only such portions of the web of synthetic resin as are to register with the corners or other desired areas of a resinous web. If the flow is increased throughout the width of the nozzle, a band of increased thickness will be developed clear across the resulting extruded web.

There are several ways which I have developed for locally increasing flow. These include:

1. An increase in the rate of rotation of the feed screw which is delivering the hot resin to the nozzle. The increase will normally be abrupt and temporary.

2. The delivery of the hot resin to the nozzle by means of a plurality of laterally spaced screws, the abrupt acceleration of the feed screws at opposite sides of the nozzle causing a localized acceleration of flow of extruded material to selected areas of the resulting web.

3. A bodily and temporary opening of the nozzle or slot-die by deformation of at least one portion thereof either locally or throughout the nozzle width.

There are others but the foregoing will illustrate the generic method for localized thickening of the plastic film by selective increase of flow. As hereinafter shown, the invention also contemplates laminating the plastic film, thickened wherever desired, to a web of woven or non-woven fabric or paper or other materials.

BRIEF DESCRIPTION OF DRAWINGS

FIG. 1 is an inverted perspective view of a diaper embodying the invention.

FIG. 2 is an inverted perspective view of a modified embodiment of a diaper embodying the invention.

FIG. 3 is a fragmentary detail view taken in section on the line 3—3 of FIG. 1.

FIG. 4 is a fragmentary detail view taken in section on the line 4—4 of FIG. 2.

FIG. 5 is a fragmentary detail perspective view of a modified construction.

FIG. 6 is a fragmentary perspective view of a further modified construction.

FIG. 7 is a fragmentary perspective view in cross section showing the manner in which the diapers are desirably folded in completion for use.

FIG. 8 is a fragmentary perspective view in cross section showing a modified embodiment of the invention in which layers of tissue are used instead of pulp or fluff to make the absorbent pad.

FIG. 9 is a diagrammatic perspective view of extruding apparatus devised for making a plastic web with localized transversely thickened bands as used in the diapers of FIGS. 1, 3 and 5.

FIG. 10 is a fragmentary diagrammatic view showing an extruding mechanism similar to that of FIG. 9 except that it is used to produce webs having localized laterally spaced thickened areas of the type shown in FIGS. 2, 4 and 6.

FIG. 11 is a front elevational view of a waist type apron made in accordance with the invention.

FIG. 12 is a front elevational view of a bib type apron made in accordance with the invention.

FIG. 13 is a diagrammatic side elevational view showing the making of a laminate including a plastic web.

FIG. 14 is a plan view of a fenestrated towel or sheet made by the procedures herein described.

FIG. 15 is a fragmentary perspective view of a web having somewhat spaced transversely extending reinforced areas between which the web is to be severed.

FIG. 16 is a view similar to FIG. 14 showing localized thickened areas at the sides of the web and between which transverse severance takes place.

FIG. 17 is a view somewhat similar to FIG. 13 but showing a plurality of webs coextruded from a compound extruding die.

DETAILED DESCRIPTION

Figure 19:
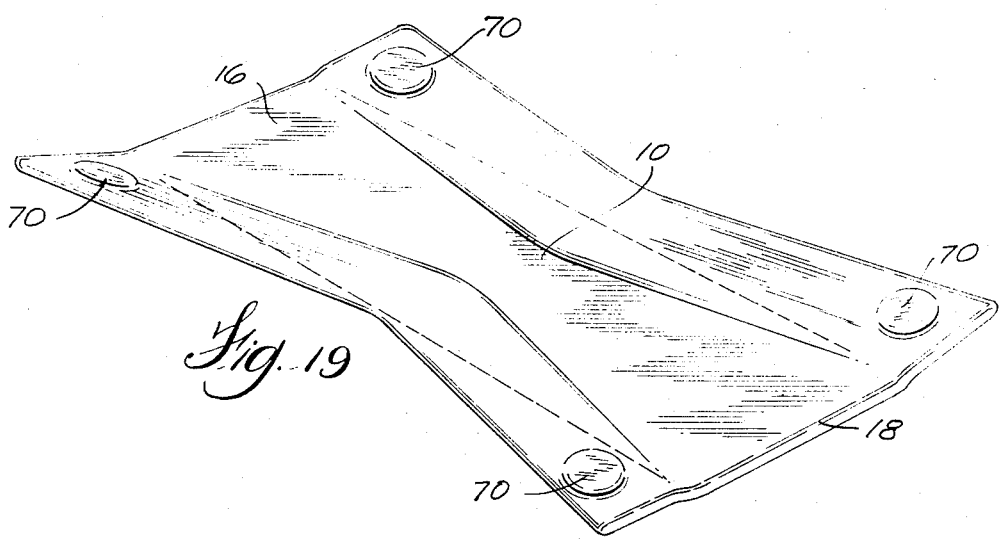
FIG. 19 is another view in perspective of a different embodiment of the diaper partially folded for use in accordance with the invention.

Aside from the invention herein disclosed, the articles selected for exemplification in the drawings may be of previously known constructions. THe diaper shown in FIGS. 1, 3 and 5 comprises a top ply 10 (it is underneath in the inverted views but on top when in use) which is of tissue or non-woven fabric and is porous to admit fluids into the filler pad 12. In order to confine the fluid to the filler pad, the backing ply 14 is desirably a sheet of waterproof synthetic resin. In use, it underlies the rest of the diaper. At its ends 16 and 18 and along its side margins 20 and 22, the water resistant or waterproof backing ply 14 is marginally adhered to the facing ply 10, either directly or through a side strip. In the exemplification of FIG. 4, the facing ply 100 has a reinforcing strip 26 of synthetic resin along its side margins, the whole side margin 28, thus reinforced, being turned over about the pad 12 and secured to the under surface of the backing ply 140.

It is common to complete diapers of the disclosed types by folding inwardly the side margins 20 and 22 and, at some point intermediate the length of the diaper, using dots of adhesive 30 to connect portions of the inwardly folded flaps to the facing ply 10 as shown in FIG. 7.

To achieve the advantages of the present invention, the backing plies 14 and 140 are made by extrusion and the resulting web is thickened locally by accelerating the flow of hot resin through the extrusion nozzle, either generally or locally. One way of accomplishing this result is to use a motor 34 for driving a feed screw 36 through a planetary transmission 38 whereby the rate of operation of the feed screw may be accelerated at any time by using a ram 40 to apply a brake 42 to a shaft 44 of the planetary transmission 38. As diagrammatically illustrated, a pressure line 46 leading to ram 40 is provided with a valve 48 having a stem 50 which is periodically actuated by a cam 52 to open the valve 48 briefly and thus momentarily pressure-operating the ram 40 to apply the brake 42 and momentarily to accelerate the operation of feed screw 36. No means of operating the cam 52 is illustrated since this may be done manually or by a timer or by interconnection with the diaper manufacturing machinery.

The heated and viscous synthetic resin is introduced by means of hopper 54 into the conveyor housing 56 leading to the extrusion nozzle 60. From the nozzle 60 issues a continuous web 62 of extruded synthetic resin. This web has selectively thickened areas such as the transverse bands shown at 64, these being produced by an abrupt and temporary increase in flow which, in this particular embodiment, involves acceleration of the feed screw to increase briefly the amount of resin discharged by the nozzle. There are numerous other ways for producing momentary increase in flow either by local increase in pressure or by locally opening the split nozzle.

Since the web is to be severed into sheets as at 68 for backing ply purposes, the arrangement may be such that severance occurs through a transversely thickened band 64 which has twice the width of the thickened bands 66 at the opposite ends of the backing ply 14 shown in FIGS. 1, 3 and 5. Any desired width may be produced by changing the shape of the cam 52 to vary the relative length of time for which the increased flow will occur through the nozzle.

Alternatively, there may be two bands close together and the web may be severed between them as shown in FIG. 6. A thickened band 66 which extends completely across the diaper as in FIGS. 1, 3 and 5 is particularly intended for use when tapes or diaper pins are to be used without fastening to the shirt.

The thickening of zones 70 may be limited to one or more corners (FIG. 2) or to points near the corners of the resulting article as in FIG. 16. If desired, the apparatus used for this purpose may be essentially identical with that shown in FIG. 9 except that the feed screws 36 and housing 56 are duplicated and led into the nozzle 600 adjacent the opposite ends of its extrusion slot as shown in FIG. 10. When a momentary increase in flow occurs in the resin fed in viscous form into the nozzle 600, the resin will increase the thickness of the extrusion locally, it being more easily discharged from the nozzle than spread transversely therein. The result is to produce a web 620 with localized and laterally spaced thickened areas 700.

As above noted, there are several ways which are mechanically different and in which pressure or flow variations may be employed for a temporary increase in flow either in localized areas or across the nozzle to produce selectively the integral locally thickened webs herein contemplated.

As a result of this construction, those portins of the backing strip which contact the body in the crotch area of the person to whom the diaper is applied will be relatively very thin and flexible. Yet those portions of the backing strip which are required to receive the stress of the diaper pin or tape will be made sufficiently heavy to sustain this stress without tearing.

Although the invention has heretofore been exemplified by showing locally thickened webs applied to various diapers, the articles in which the invention is useable are by no means limited to a single film. Two or three or more webs having the same or different characteristics may be laminated to each other, if desired. FIG. 13 suggests that just after the plastic web emerges from the extruding slot-die 72 it may be laminated to a web 74 which may be extruded in the same manner as above described, or may be paper or fabric or nonwoven fabric, or another prefabricated plastic. It is even possible to extrude plural films from a compound extruding die which may be mechanically unitary as shown in FIG. 17. The die 600 there diagrammatically illustrated, has internal chambers 601 and 602, respectively supplied with extrudable material through separate inlet pipes 560 and 562. A dividing plate or plates 75 may be used as a partition between the chambers 601 and 602. The issuing films 720 and 722 may be alike or different in material and one or both may have the locally thickened areas above described. If laminated immediately following extrusion, they will adhere on contact. However, whether the arrangement shown in FIG. 13 or that shown in FIG. 17 is used, and regardless of how many webs are to be laminated, the webs may be brought together in the bight of rolls 76 and 78. Normally, the roll 76 would be a warm roll and the roll 78 a chilled roll with a soft jacket to accommodate the locally thickened portions of web 72. The compounded web 80 or laminate may be used wherever desired.

Examples of such use are shown in FIGS. 11, 12 and 14. FIG. 11 shows a waist apron 82 which has integral strips 84 partially severed from the sides of the web 80 to serve as ties to be fastened about the wearer's waist as indicated by the dotted lines 86. In order that the apron may be soft and pliable throughout most of its area while, at the same time, avoiding tearing between the ties and the rest of the aprons, the areas 88 at the juncture of the ties to the rest of the apron are thickened by momentary local increase in flow of the resin as it leaves the extruding die, such localized increase being effected by any of the procedures above noted.

FIG. 12 shows a bib apron 90 with similar ties at 92 and locally thickened at protective areas 94. This apron also has a thickened loop portion 96 through which the wearer's head passes for the support of the apron.

Similarly, the fenestrated towel 98 shown in FIG. 14 has a locally thickened zone 100 about the fenestration opening 102 to avoid tearing, while leaving the major part of the towel or sheet 98 soft and pliable.

In the accompanying claims, the word "plastic" is used in accordance with the ordinary parlance to refer to a synthetic resin which, for the purposes of the present invention, will be understood to be extrudable.

While reference has been made herein to various techniques for producing these diapers, it is to be understood that in many respects it is not desired to limit this application to method. In many cases, the waist band area has low stretchability so hat the diaper will not slide from the baby's body. If the diaper is too stretchable, it may slide off. Because of its pliable nature and conformable crotch area, it will better fit children of varying ages and physical structures. The instant diaper will be much softer and more conformable in the crotch 98 than a conventional diaper even when combined with an inherently stronger and less stretchable waist band. This tends to reduce rashes such as may be produced by stiff, hard films that rub and irritate a baby's soft skin.

Figure 20:
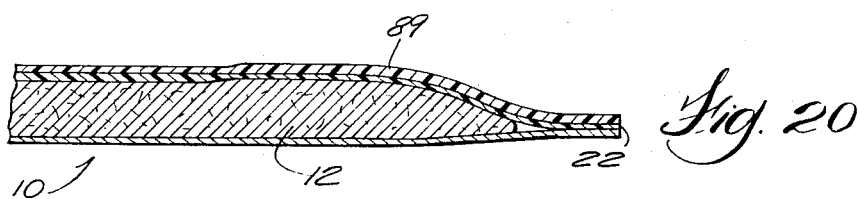
FIG. 20 is a fragmentary view in cross section of a diaper having along one end margin a thickened anchorage ply portion.
Figure 18:
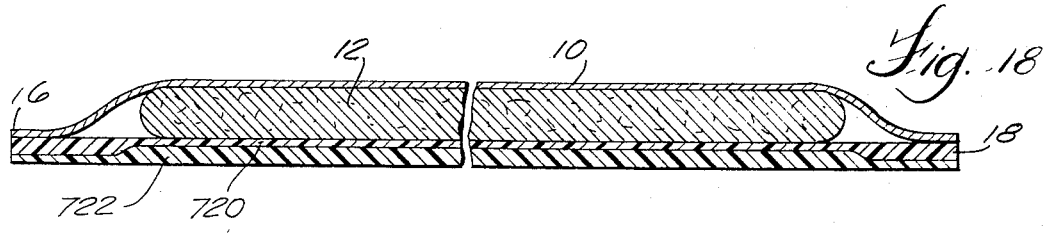
FIG. 18 is a view taken in longitudinal section embodying coextruded webs as backing.
Figure 21:
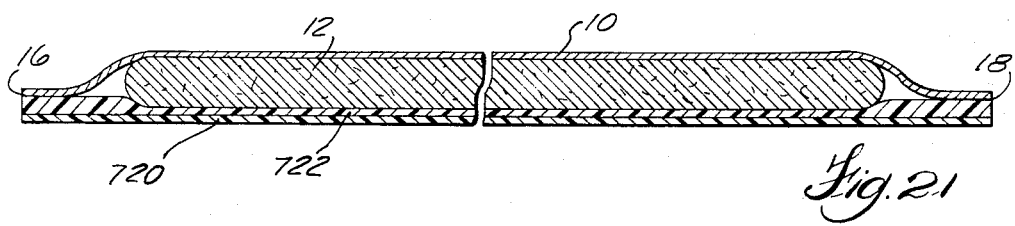
FIG. 21 is a sectional view similar to FIG. 18 but with the coextruded portions having different locations.

One way of making the backing sheet stronger in the pinning area is to make it thicker as was done at the end of the side of the diaper at 89 in FIG. 20. Another is to apply over the pad 12 an extrusion of two or more films in which (in FIG. 21) one film 722 may be thicker at the pinning points at ends 16 and 18 and another film 720 may be softer in the crotch area whether or not it is stronger. In FIG. 18, the ply 722 is the outermost and the thickest in the crotch area and ply 724 has different characteristics.

I claim:

1. A diaper or the like comprising an absorbent pad having attached to it an impervious plastic web, having relatively thick integral areas forming portions of the side margins and end margins of the diaper which extend inwardly from the ends and side edges of the web to form wide fastening zones which are tear resistant to receive connections for positioning the diaper.

2. A diaper or the like according to claim 1 in which relatively impervious thick areas are present at least at one corner of the diaper.

3. A diaper or the like according to claim 1 in which relatively impervious thick areas are present at least across one end of the diaper.

4. A diaper or the like according to claim 1 in which relatively impervious thick areas are folded around at least one longitudinal side of the diaper.

5. A diaper or the like comprising an absorbent pad having attached to it an impervious plastic web, having relatively thick integral areas tear resistant to receive connections for positioning the diaper and in which relatively thick areas of the impervious plastic sheet are spaced inwardly of the longitudinal edges of the absorbent pad.

6. A diaper according to claim 1 in which the impervious plastic sheet has said relatively thick areas spaced away at least from the crotch area.

7. A diaper or the like according to claim 1 in which at least a part of the plastic sheet is a laminate comprising a coextrusion consisting of plies of differing characteristics.

8. A diaper or the like comprising an absorbent pad having attached to it an impervious plastic web, having relatively thick integral areas tear resistant to receive connections for positioning the diaper in which at least a part of the plastic web is a laminate comprising a coextrusion consisting of plies of differing characteristics and in which one layer of the laminate is thick at the ends of the diaper while the other layer is correspondingly thick in the crotch portion thereby forming a laminate of substantially uniform total thickness while the ends are substantially stronger and less stretchable than the softer more conformable crotch area.

9. A diaper or the like according to claim 1 and having a crotch area and as to which areas spaced from said crotch area of the back sheet have less stretch and more strength than other areas thereof.

10. A diaper or the like according to claim 1 in which the diaper has a waist band area and the part of the waist band area of the plastic sheet at least at one end has less stretch and more strength than other portions of said waist band area of the diaper.

11. A diaper or the like according to claim 1 in which the absorbent pad has a pervious facing consisting of at least one ply of a high wet strength facial tissue.

12. A diaper of the like comprising an absorbent pad and a facing comprising an impervious external polymeric ply of non-uniform thickness.

13. A diaper or the like according to claim 1 in which the diaper has a crotch area from which relatively stronger and less stretchable back sheet areas are spaced, the crotch area being not only softer but more conformable than said last mentioned areas.

14. A diaper or the like according to claim 7 in which the coextrusion has one web relatively stronger and less stretchable than the other and the other web being softer and more conformable than the first mentioned web.

15. A diaper or the like according to claim 1 in which a "C" folded wrapper structure encloses the pad.

16. A diaper or the like according to claim 1 in which a box pleated backing encloses at least the crotch section of the pad.

17. A diaper according to claim 1 in which there is a back wrapper structure provided with a multiplicity of longitudinal folds constituting a box pleat configuration enclosing the pad.

18. In a diaper according to claim 1, a plastic web having a selected portion locally thick as compared with other portions of the web, all said portions being integral, said other portions being relatively flexible and soft, and said thick portion being relatively tear-resistant.

19. An article according to claim 18 in which the thick portion comprises a band extending transversely of the web.

20. An article according to claim 18 in which the thick portion comprises a relatively small area of limited lateral extent.

21. An article according to claim 17 in which the web is laminated to another web of different characteristics.

22. An article according to claim 21 in which the first mentioned web and said other web are extruded in immediate proximity to each other and immediately laminated together.

23. An article according to claim 1 in which said other web is a web of paper.

24. An article according to claim 22 in which said other web is a web of fabric.

* * * * *